US012669355B2

(12) United States Patent
Zander et al.

(10) Patent No.: US 12,669,355 B2
(45) Date of Patent: Jun. 30, 2026

(54) FLOWMETER

(71) Applicant: SIKA DR. SIEBERT & KÜHN GMBH & CO. KG, Kaufungen (DE)

(72) Inventors: Stefan Zander, Kassel (DE); Sergius Schmidt, Kassel (DE); Bastian Bleichert, Kaufungen (DE)

(73) Assignee: SIKA DR. SIEBERT & KUHN GMBH & CO. KG, Kaufungen (DE)

( * ) Notice: Subject to any disclaimer, the term of this patent is extended or adjusted under 35 U.S.C. 154(b) by 257 days.

(21) Appl. No.: 18/572,675

(22) PCT Filed: Jun. 24, 2021

(86) PCT No.: PCT/EP2021/067408
§ 371 (c)(1),
(2) Date: Dec. 20, 2023

(87) PCT Pub. No.: WO2022/268330
PCT Pub. Date: Dec. 29, 2022

(65) Prior Publication Data
US 2024/0288289 A1 Aug. 29, 2024

(51) Int. Cl.
*G01F 1/32* (2022.01)
(52) U.S. Cl.
CPC .................................. *G01F 1/3218* (2013.01)
(58) Field of Classification Search
CPC ...................................................... G01F 1/32
See application file for complete search history.

(56) References Cited

U.S. PATENT DOCUMENTS

2008/0288181 A1* 11/2008 Lucero ...................... G01F 1/32
702/50

FOREIGN PATENT DOCUMENTS

| | | | | |
|---|---|---|---|---|
| CN | 204330032 U | 5/2015 | | |
| DE | 102015221355 A1 * | 5/2016 | ........... | G01F 1/3218 |
| DE | 102018101278 A1 | 7/2019 | | |
| EP | 3594634 A1 | 1/2020 | | |
| JP | 2004191173 A | 7/2004 | | |
| JP | 2005061986 A | 3/2005 | | |
| JP | 2005098721 A | 4/2005 | | |
| JP | 2006098318 A | 4/2006 | | |
| WO | WO-2006034851 A1 * | 4/2006 | ........... | G01F 1/3209 |

* cited by examiner

*Primary Examiner* — John E Breene
*Assistant Examiner* — Alex T Devito
(74) *Attorney, Agent, or Firm* — Dinsmore & Shohl LLP

(57) ABSTRACT

A flowmeter for measuring the flow rate of a fluid has a measuring tube which forms a measurement space through which the fluid can flow. At least one disruptive body is arranged in the measurement space. The measurement space additionally has, downstream of the disruptive body, a pickup arranged in it that can be deflected based on a vortex formation at the disruptive body. In order to minimize the flow resistance for the fluid when flowing through the flowmeter, the measuring tube has an elliptical cross-section at least in the region of the arrangement of the disruptive body.

18 Claims, 4 Drawing Sheets

FLOWMETER

CROSS-REFERENCE TO RELATED APPLICATIONS

This application is the U.S. National Stage of PCT/EP2021/067408 filed on Jun. 24, 2021, the entire content is incorporated herein by reference in its entirety.

FIELD OF THE INVENTION

The invention relates to a flowmeter for measuring the flow rate of a fluid having a measuring tube that forms a measuring space through which the fluid can flow and having at least one baffle that is arranged in the measuring space and wherein a measured value sensor that is deflectable when flowed around by the fluid due to a vortex formation at the baffle is furthermore arranged downstream of the baffle in the measuring space.

BACKGROUND OF THE INVENTION

Flowmeters of the kind of interest here are also called vortex current sensors and are widely used in the flow metering of fluids, in particular of liquids. They are characterized by high reliability and small manufacturing costs. There is, however, a disadvantage due to the vortex formation in the fluid required for the measurement in a comparatively high pressure loss on the throughflow by the fluid which is accompanied by an energetic loss in the fluid system in which the flowmeter is integrated.

A plurality of approaches are known to minimize the pressure loss; for example, in accordance with a first approach, the pressure loss can be minimized by the optimized geometry of the baffle. A plurality of baffle geometries have thus become known in the meantime that differ from the standard shapes of a cylindrical member or of a delta baffle.

A further approach to reducing the pressure loss comprises the minimization of the cross-section of the measuring tube in the region of the damming member so that flowmeters are known that have a measuring space that tapers up to the baffle and that widens again downstream of the baffle. As a result, the measurement cross-section here is also smaller than, for instance, the nominal diameter of the connections of the flowmeter. An attempt is thus made to limit the required measurement cross-section to a space that is as small as possible to thus minimize the total pressure loss. In the present description, cross-sections of the measuring space or of the measuring tube always designate those cross-sections on whose cross-sectional areas the flow axis forms a surface normal, that is it is perpendicular to the cross-sectional area.

A third approach comprises optimizing the dimensioning between the baffle and the flow cross-section. For this purpose, the pressure loss in the measured value can initially be considered separately from the pressure loss of the baffle. It then applies to the measuring tube that, for a defined volume flow, the pressure loss increases with a smaller cross-section. It applies to the baffle that the pressure loss likewise increases with a larger onflow area. In accordance with the third approach, an optimum can likewise be sought in the determination of the relationships between the cross-section of the measuring tube and the dimensioning of the baffle.

DE 10 2018 101 278 A1, for example, describes a flowmeter for measuring the flow rate of a fluid having a measuring tube that forms a measuring space through which the fluid can flow and having at least one baffle that is arranged in the measuring space and wherein a measured value sensor that is deflectable when flowed around by the fluid due to a vortex formation at the baffle is furthermore arranged downstream of the baffle in the measuring space. Provision is made for the optimization of the vortex formation that at least one projection that projects into the measuring space is formed upstream of the baffle at an inner wall bounding the measuring space. The vortices that form at the baffle can thereby be amplified so that a comparatively high voltage level can be output over the measured value sensor with an overall low pressure loss.

The geometry of the damming member mainly acts on two flow-mechanical properties that are important in a vortex current sensor. One of these properties is the pressure loss that is e.g. comparatively low with respect to geometries cylindrical with respect to the onflow area. The other desired property is a Strouhal number that is as constant as possible over wide ranges of the Reynolds number. It is thereby achieved that the vortex frequency as a primary measured variable has a linear relationship with the amount of the flow rate calculated therefrom. Unlike cylindrical baffles, the delta-shaped baffle demonstrates particularly good properties here. Other shapes of baffles that attempt to combine the advantages of both geometries are typically designed in a much more complicated manner and are thus substantially more laborious and/or expensive in practice in the production process.

The simple reduction of the pressure loss in the throughflow of the flowmeter, however, does not necessarily result in a higher efficiency in the measured value recording. A high voltage level with a low pressure loss overall is desirable.

SUMMARY OF THE INVENTION

The object of the invention is the further improvement of a flowmeter for measuring the flow rate of a fluid, wherein the objective is reached of achieving a ratio of the voltage potential of the measured value sensor to the pressure loss of the fluid flowing in the measuring tube that is as high as possible by a geometrical optimization of the flow cross-section in the measuring tube.

This object is achieved starting from a flowmeter as disclosed herein. Advantageous further developments of the invention are disclosed herein.

The invention includes the technical teaching that the measuring tube has an elliptical cross-section at least in the region of the arrangement of the baffle.

The ratio of the usable measured signal to the pressure loss can be directly improved by an advantageously selected ellipsoid shape of the cross-section of the measuring tube at least in the region of the arrangement of the baffle and thus maximizes the efficiency of the flowmeter.

The ellipsoid shape of the cross-section of the measuring tube can be present exactly in the plane of the arrangement of the baffle and in an adjacent region in front of and behind the baffle, for example in a range between 10% and 20%, between 20% and 30%, between 30% and 40%, between 40% and 50%, between 50% and 60%, between 60% and 70%, and/or between 70% and 80%, with respect to the total length of the measuring rube or with respect to the length between the baffle and the fluid inlet or the fluid outlet of the measuring tube.

A continuously wide region in the width direction in which the vortices can form spatially well laterally of the baffle is provided due to the horizontal ellipsoid shape with respect to the vertical baffle axis of the baffle, while a constriction takes place over the secondary axis of the ellipse tapering toward the baffle and a widening again takes place in the vertical direction in the flow direction after the baffle. The flow rate for the onflow of the baffle is thus increased and the flow rate forms a maximum in the region of the baffle.

The vortices here primarily form in the region of the main axis of the ellipse, whereby the effect of the pressure fluctuations on the measured value sensor and to this extent on its deflection have an advantageous effect on a high voltage level of the output voltage of the measured value sensor while at the same time the flow is accelerated in order thus also to increase an intensification of the fluidic effect on the measured value sensor. As a result, the positive effect results from a better ratio between the measured signal of the measured value sensor and the pressure loss.

The measuring space of the measuring tube extends between a fluid inlet and a fluid outlet along a flow axis, wherein the fluid inlet has a circular cross-section that merges into the elliptical cross-section along the flow axis extending up to the position of the baffle. To this extent, the elliptical cross-section merges into the circular cross-section from the position of the baffle along the baffle axis up to the fluid outlet. The measuring space of the measuring tube is shaped over the total length such that the measuring space starts with a circular cross-section and ends with a circular cross-section and the ellipsoid shape in particular has its maximum in the region of the baffle, which means that a maximum ratio between the main axis and the secondary axis of the ellipse is present at the position of the baffle, the ratio decaying as the distance from the baffle to the fluid inlet and from the baffle to the fluid outlet increases.

The baffle extends in a manner known per se along a baffle axis, wherein the baffle axis forms the axis along which the baffle preferably does not change its cross-section. The baffle axis here extends perpendicular to the flow axis extending through the measuring space. The baffle can have a round, elliptical, streamlined, trapezoid, or triangular cross-section in conjunction with the features in accordance with the invention.

The elliptical cross-section is spanned by a longer main axis and a shorter secondary axis extending transversely to the main axis. The alignment of the main axis and the secondary axis is provided here such that the secondary axis coincides together with the baffle axis. The advantage results from this that the main axis extending transversely thereto forms a wider space laterally next to the baffle in which the vortices can form and the vortices can migrate downstream better to act on the measured value sensor.

Provision is in particular made that the length ratio from the main axis to the secondary axis has a value from 1.2 to 2.0, preferably from 1.25 to 1.8, and particularly preferably from 1.3 to 1.6. The ratio of the length of the main axis to the working surface of the baffle in particular has a value from 0.15 to 0.6, preferably from 0.2 to 0.5, and particularly preferably from 0.25 to 0.45.

In accordance with a further advantageous embodiment of the elliptical shape of the measuring space along the flow axis, the cross-section of the fluid inlet and/or of the fluid outlet has a diameter dimension that corresponds to the length of the main axis of the elliptical cross-section. The width of the measuring space transversely to the flow axis from the fluid inlet to the fluid outlet thereby remains constant. The cross-section of the measuring tube only narrows in the axial direction of the baffle due to the formation of the elliptical cross-section in accordance with the invention in the region of the arrangement of the baffle within the measuring tube while the cross-section in the direction of the main axis remains unchanged and corresponds to the diameter of the circular cross-section of the fluid inlet and/or of the fluid outlet.

The measured value sensor is arranged in a section along the flow axis in the measuring space in which the cross-section of the measuring space has an elliptical cross-section that, however, again merges into the circular cross-section in the direction toward the fluid outlet. The ratio between the main axis and the secondary axis of the elliptical cross-section is to this extent slightly smaller in the region of the arrangement of the measured value sensor than in the region of the baffle.

Even further advantageously, at least one projection that projects into the measuring space is formed upstream of the baffle at an inner wall bounding the measuring space. The effect of vortex amplification is thereby achieved so that a high level of the output voltage of the measured value sensor can also already be achieved at low flow rates of the fluid in the measuring tube. It can be assumed as the cause of this effect that the arrangement of at least one projection and preferably of two oppositely disposed projections upstream of the baffle generates pre-turbulences at the projection and the turbulences generated at the projection shed from the projection and can amplify the vortices formed at the baffle in an Kármán vortex street that forms. As a result, a greater action on the measured value sensor results due to the amplified vortices periodically shed at the baffle. It is particularly advantageous if two diametrically opposed projections, in which a diametral defined by the projections is in parallel with the main axis of the elliptical cross-section, are present at the inner wall of the measuring tube in the region of the fluid inlet.

Downstream and upstream are to be understood here such that the indication downstream is understood as the direction with the flow axis toward the fluid outlet and downstream as the direction opposite the flow axis toward the fluid inlet.

BRIEF DESCRIPTION OF THE DRAWINGS

Further measures improving the invention will be shown in more detail below together with the description of a preferred embodiment of the invention with reference to the Figures. There are shown.

DETAILED DESCRIPTION OF THE INVENTION

Figure 1:
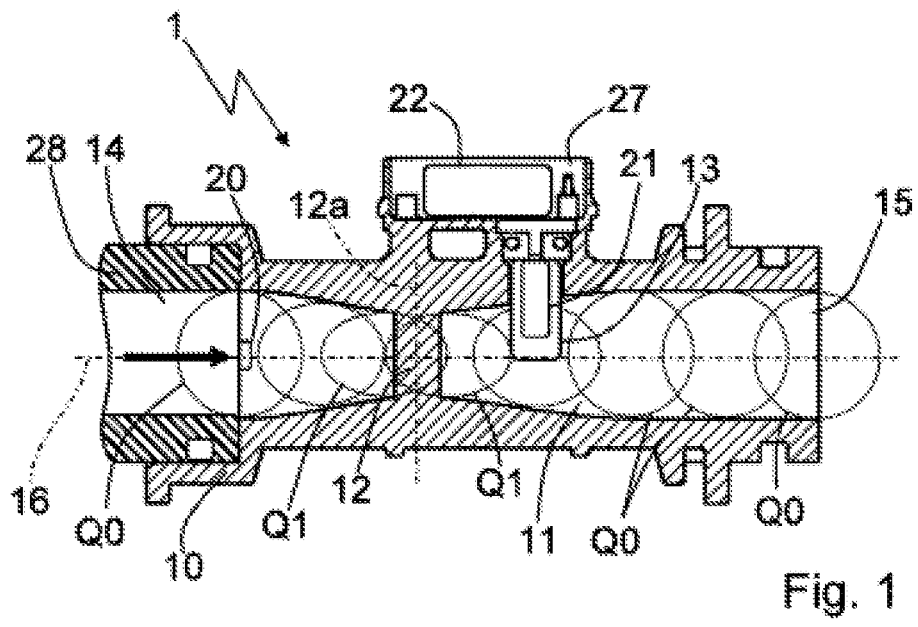
FIG. 1 is a cross-sectional view of the flowmeter with a measuring space that has the geometrical design in accordance with the invention.

A cross-sectional view of the flowmeter 1 is shown in FIG. 1 and the flowmeter 1 is shown sectioned from the left to the right along the flow axis 16 in accordance with the arrow shown and can be flowed through. The flowmeter 1 serves the determination of a flow per time that flows through the measuring tube 10 of the flowmeter 1. The through flowable region of the measuring tube 10 is called a measuring space 11 and there are a baffle 12 and a measured value sensor 13 arranged downstream in the measuring space 11 and thus in the flowing region of the fluid. The baffle 12 is located upstream in front of the measured value sensor 13 with respect to the flow axis 16 and periodically shedding vortices are formed at the baffle 12 by the onflow thereof that result in a deflection of the measured value sensor 13 in a deflection direction transversely to the flow axis 16. The deflection of the measured value sensor 13 likewise takes place periodically here, whereby a measured signal can be derived in that a measuring element 21 that can be formed with the measuring electronics 22 is arranged in conjunction with the measured value sensor 13. The measuring element 21 is preferably designed as a piezo element.

The baffle 12 extends along a baffle axis 12a that extends transversely to the flow axis 16. The measured value sensor 13, that projects into the measuring space 11 in the manner of a sword and that is arranged below the measuring electronics 22 that are mounted in a measuring electronics mount 27 at the outer side at the measuring tube 10, extends in parallel with; but downstream of, the baffle axis 12a.

The measuring tube 10 extends from a fluid inlet 14 up to a fluid outlet 15, with a connection stub 26 being shown in the fluid inlet 14.

In accordance with the invention, the cross-section of the measuring tube 10 has an elliptical cross-section Q1 in the region of the arrangement of the baffle 12. In contrast, the measuring tube 10 has a cross-section in the region of the fluid inlet 14 and in the region of the fluid outlet 15 that is designed in accordance with a circular cross-section Q0. The cross-section of the measuring space 11 along the flow axis 16 consequently changes starting with a circular cross-section Q0 in the fluid inlet 14 up to an elliptical cross-section Q1 in the region of the arrangement of the baffle 12 and merges into a circular cross-section Q0 again at the fluid outlet 15 in the further extent downstream along the flow axis 16. The circular cross-section Q0 is only reformed after the arrangement of the measured value sensor 13, with, only by way of example, a longer region along the flow axis 16 having the circular cross-section Q0 downstream than before the arrangement of the baffle 12, which can also be provided conversely. The cross-sections Q0 and Q1 are rotated by a vertical axis 90° in the sectional plane for the visualization.

The ellipsoid shape of the elliptical cross-section Q1 is designed as horizontal with respect to the direction of extent of the baffle axis 12a, with the longer main axis of the elliptical cross-section Q1 corresponding to the diameter of the circular cross-section Q0.

Two projections 20 that project into the measuring space 11 are formed upstream of the baffle 12 at an inner wall 19 bounding the measuring space 11 to optimize the vortex formation. The vortices that form at the baffle 12 can thereby be amplified so that a comparatively high voltage level can be output over the measured value sensor with an overall low pressure loss.

Figure 2:
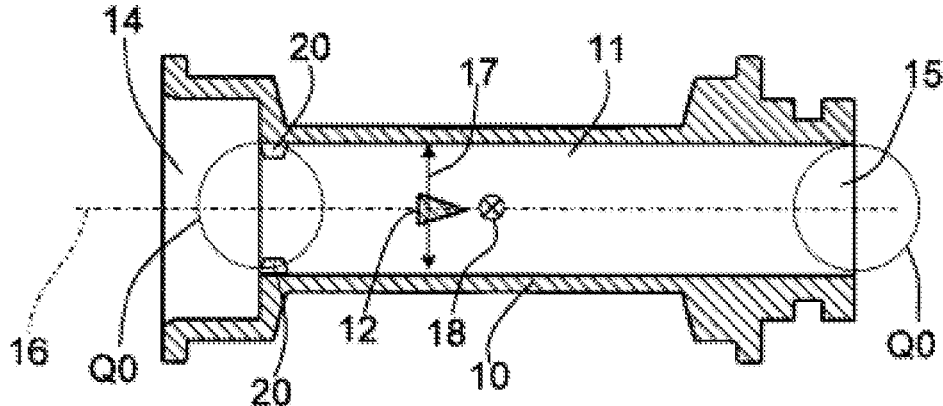
FIG. 2 is a cross-sectional view of the flowmeter with a cross-sectional plane that is rotated by 90° with respect to the cross-sectional plane of the cross-section in accordance with FIG. 1.

Consequently, the width of the measuring tube 10 does not change at half the plane between the fluid inlet 14 and the fluid outlet 15, as the cross-sectional shape rotated by 90° in FIG. 2 shows. It results from this that the main axis 17 of the elliptical cross-section corresponds to the diameter of the circular cross-section Q0 so that the representation in FIG. 2 shows a measuring space 11 in the measuring tube 10 whose width does not change from the fluid inlet 14 up to the fluid outlet 15. The representation also in particular shows that two diametrically opposed projections 20 are arranged at the inner wall 19 of the measuring space 11 that are disposed opposite one another such that they are positioned along the main axis 17 of the elliptical cross-section Q1 at its outer sides, with the projections 20 still being provided before the elliptical cross-section Q1 in the region of the circular cross-section Q0 at the level of the fluid inlet 14.

Figures 3A, 3B:
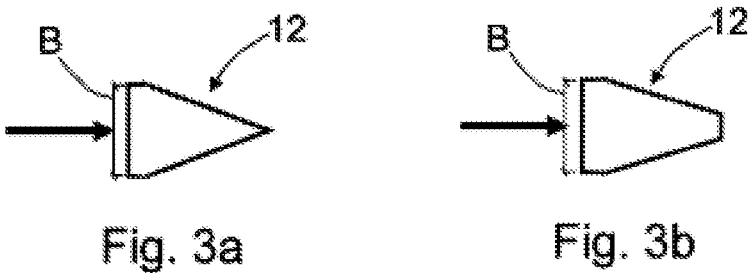
FIG. 3a is a first advantageous cross-sectional geometry of the baffle.
FIG. 3b is a second advantageous cross-sectional geometry of the baffle.

FIG. 3a shows a possible cross-sectional shape of a baffle 12 that substantially corresponds to a triangular shape, with the basic shape of the triangle of the cross-sectional shape having a rectangular start that faces in the opposite direction to the flow and is to this extent flowed on directly on use of the flowmeter 1. Measured transversely from this rectangular start, the baffle 12 has a width B that extends with respect to the installation location of the baffle 12 in the measuring space 11 in the same direction as the main axis 17 of the elliptical cross-section Q1.

FIG. 3b shows a further possible shape of a baffle 12 having a trapezoidal cross-section, with the latter likewise having a rectangular base section.

The baffles 12 in FIGS. 3a and 3b are flowed onto in accordance with the shown arrow so that the wide, planar front side of the triangular shape and of the trapezoidal shape faces opposite to the flow.

In particular the cross-sectional shapes of the baffle 12 shown in FIGS. 3a and 3b can be used particularly advantageously in the measuring tube 10 in conjunction with the measuring space 11 shaped in accordance with the invention.

Figure 4:
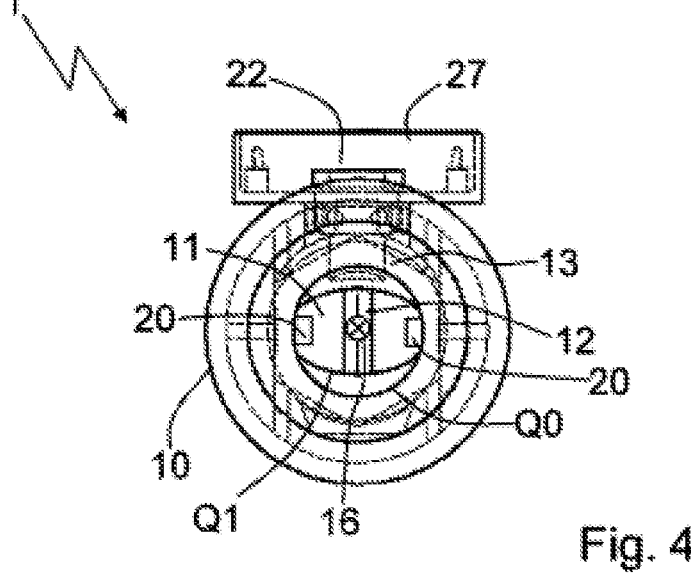
FIG. 4 is a view of the flowmeter with a view into the measuring space seen from the flow axis.

FIG. 4 shows a view of the flowmeter 1 from the direction of the flow axis 16 so that it is possible to look into the measuring space 11 of the measuring tube 10. The view at the front side shows the circular cross-section Q0 into which the two diametrically opposed projections 20 at the inner wall 19 of the measuring space 11 also project, with the circular cross-section Q0 in the region of the baffle 12 merging into the elliptical cross-section Q1. The measured value sensor 13 is shown at the upper side that is connected to the measuring electronics 22 that is mounted in the measuring electronic mount 27 at the outer side at the measuring tube 10. The illustration again illustrates the horizontal arrangement of the ellipse of the elliptical cross-section Q1 as explained in more detail in conjunction with the following FIG. 5.

Figure 5:
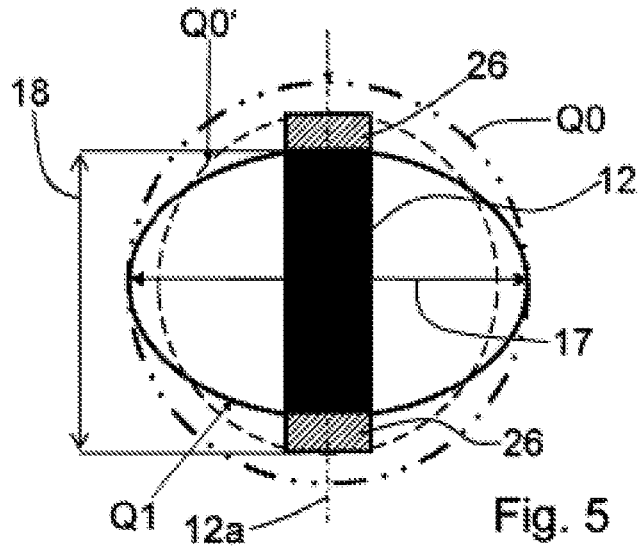
FIG. 5 is a schematic representation of the baffle with different cross-sectional geometries of the measuring space.

FIG. 5 shows the changing cross-section in a schematic view, with the cross-section changing starting from the circular cross-section Q0 and merging into the elliptical cross-section Q1 in the region of the baffle 12. The ellipse of the elliptical cross-section Q1 has a main axis 17 that is horizontal so that the main axis 17 and the baffle axis 12a are perpendicular to one another. In contrast, the secondary axis 18 of the ellipse of the elliptical cross-section Q1 extends together with the baffle axis 12*a* in the vertical direction in accordance with the representation.

The ellipse is formed by the longer main axis 17 and the shorter secondary axis 18, with the length of the main axis 17 corresponding to the diameter of the circular cross-section Q0.

If the measuring tube 10 were to maintain a circular cross-section that has a tapering cross-section up to and into the position of the baffle 12, the comparison circular cross-section Q0' would result. It becomes clear in this respect that the region is shortened laterally to the baffle 12 where the vortices should form since the diameter of the tapered circular cross-section is smaller than the main axis 17 that corresponds in an unchanged manner to the dimension of the diameter of the circular cross-section Q0. In contrast, the shortened secondary axis 18 provides a shortening 26 of the baffle 12 along the baffle axis 12*a*, with this shortening 26 not having any real effect on the achievable voltage level that can be output by the measured value sensor 13, but reducing the pressure loss.

Figure 6:
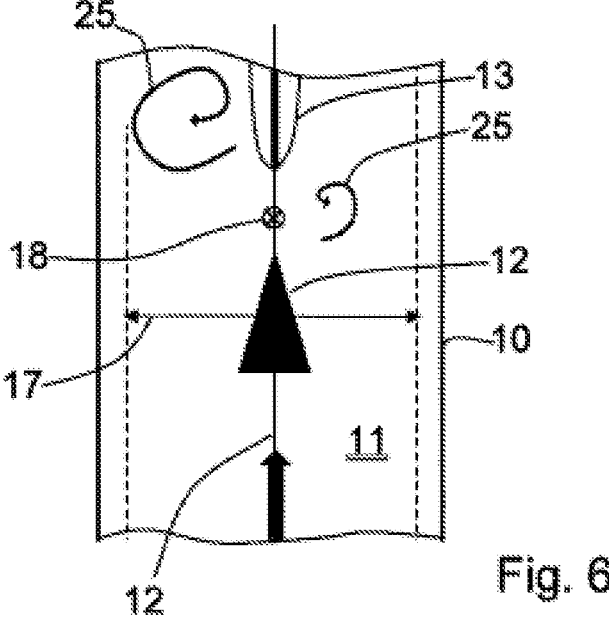
FIG. 6 is a schematic view of a vortex formation at the baffle.

FIG. 6 schematically shows a section of the measuring tube 10 with the inner side measuring space 11 in the region of the arrangement of the baffle 12. The flow axis 16 is shown as a flow arrow and the measured value sensor 13 is downstream of the baffle 12.

Vortices form at the baffle 12 that are shed periodically and that provide pressure fluctuations laterally of the measured value sensor 13 that deflect the measured value sensor 13, which can ultimately be detected by the measuring element 21. The main axis 17 here also provides a very large width in the region of the baffle 12 due to its greater length even though the secondary axis 18 of the elliptical cross-section Q1 perpendicular to the plane of the image is shortened. The flow is accelerated by the reducing flow cross-section, whereby the vortex formation is amplified and whereby a higher measurement voltage at the measurement element 21 can also already be generated at low flow rates. However, due to the widened region of the measuring space 11 in the region of the baffle 12 in the lateral direction that corresponds to the main axis 17 of the elliptical cross-section Q1, a spatially wide region is maintained in comparison with the circular cross-section Q0' in accordance with FIG. 5 so that the vortices 24 can be advantageously formed.

Figure 7:
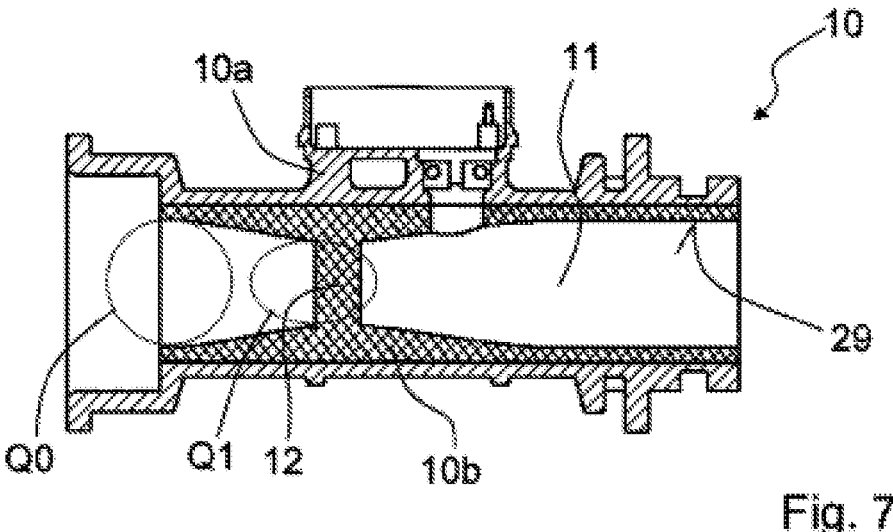
FIG. 7 is a modified embodiment of the measuring tube of the flowmeter with a sheath and with a tube insert.

FIG. 7 shows a modified form of the measuring tube 10 having a sheath 10*a* and having an inner tube 10*b* as a base member of the flowmeter, with the inner tube 10*b* being pushed into the sheath 10*a* so that the measuring tube 10 in accordance with this variant is formed in two parts.

The advantage of the two-part design is in particular provided by the simplified manufacture of the measuring tube 10 for high pressures of the measuring fluid since the elliptical cross-sections Q1 of the inner wall of the measuring space 11 and equally the baffle 12 in the measuring space 11 can advantageously be manufactured in one part with the actual inner tube 10*b* in injection molding, that is, the inner tube 10*b* having the more complex geometries can therefore be manufactured from plastic in the injection molding process, with the complexity of the geometry being of secondary importance for the plastic injection molding process for the inner tube 10*b* in comparison with a cutting production.

However, the manufacture of the sheath 10 from a metallic material is furthermore still advantageous so that the flowmeter can be designed for higher up to very high pressures of the measuring fluid. It is also of advantage that, for example, the inner passage 29 in the sheath 10*a* can have a continuous cylindrical cross-section in a simple manner and can be manufactured in a cutting manner, for example by means of a drilling procedure or by means of line boring. The base member of the sheath 10*a* can, for example, be provided as a metal die cast component or as a turned part from a correspondingly dimensioned cylindrical member or a cylindrical sleeve as a blank.

The outer diameter of the inner tube 10*b* here corresponds to the inner diameter of the sheath 10*a* so that a bypass passage is preferably formed or a slight pressing is caused.

The advantage of qualifying the flowmeter for very high pressures and of simplifying the manufacturing capability is in particular achieved in that the inner tube 10*b* can be manufactured substantially with the same length as also the length of the sheath 10*a* and/or with the sheath 10*a* and the inner tube 10*b* having a closed, fully circumferential cross-section that is pressure-tight per se, apart from small openings or the passage for the measured value sensor.

Figure 8:
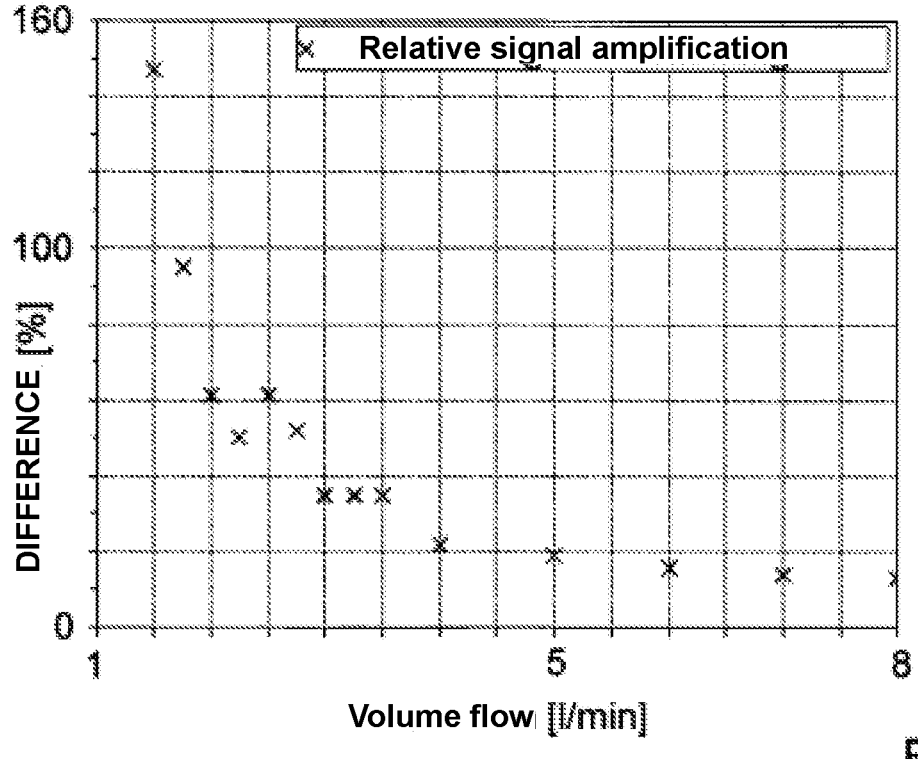
FIG. 8 is a diagram of the difference in percent of the measured voltages with an elliptical flow cross-section from a circular flow cross-section, respectively normed to the produced pressure difference.

FIG. 8 represents in a diagram the difference in percent of the measured voltages between an elliptical flow cross-section and a circular flow cross-section over the volume flow in liters per minute, in each case normed to the pressure difference produced. The diagram makes clear that the elliptical design of the measuring space enables a great increase in the measured signal in comparison with the measured signal with a circular cross-section, in each case with respect to the pressure difference, particularly at low flow rates.

Figure 9:
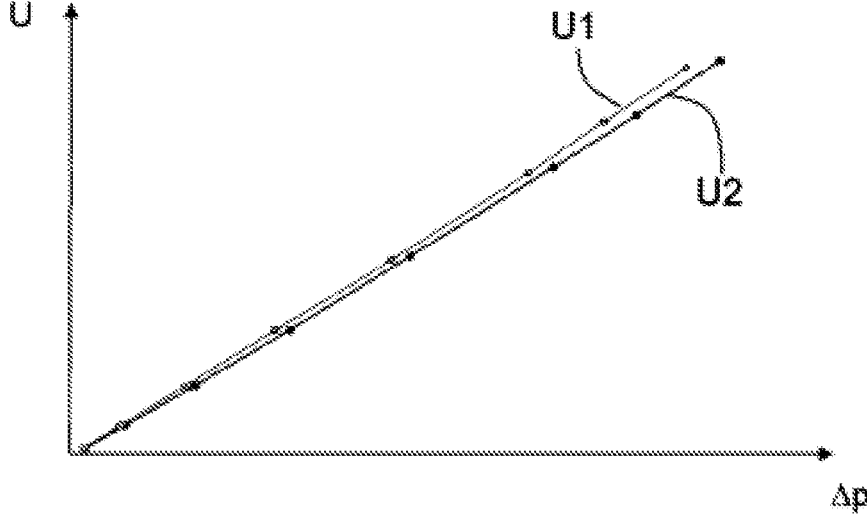
FIG. 9 is a diagram of the measured voltages over the pressure difference on the throughflow of the measuring space from the inlet up to the outlet with an elliptical flow cross-section to a circular cross-section.

FIG. 9 finally shows a diagram of the measured voltage U over the pressure difference $\Delta p_1$ measured from the inlet up to the outlet of the measuring tube. The progression of the voltage U1 over the pressure loss having an elliptical cross-section in accordance with the invention is, as the graph shows, higher than the voltage U2 over the pressure loss without the design of the elliptical cross-section.

Within the framework of the present invention, the elliptical cross-section of the measuring space shown also comprises cross-sections that are ellipsoid, that is do not necessarily have to correspond to a mathematical ellipse to this extent. A rectangular cross-section having corners designed as radii or rounded or having planar wall sections in the region of the penetration points of the main and secondary axes by the inner wall of the measuring space can thus also be covered in the sense of the invention by the claimed elliptical cross-section.

REFERENCE NUMERAL LIST 1 flowmeter
10 measuring tube
10*a* sheath
10*b* inner tube
11 measuring space
12 baffle
12*a* baffle axis
13 measured value sensor
14 fluid inlet
15 fluid outlet
16 flow axis
17 main axis
18 secondary axis
19 inner wall
20 projection
21 measuring element
22 measuring electronics
23 cone 24 shadow region
25 vortex
26 shortening
27 measuring electronics mount
28 connection stub
29 inner passage
U measured voltage
U1 voltage over pressure loss with ellipse
U2 voltage over pressure loss without ellipse
Δp pressure difference inlet to outlet
Q1 elliptical cross-section
Q0 circular cross-section
Q0' comparison circular cross-section
B width of the baffle

The invention claimed is:

1. A flowmeter for measuring the flow rate of a fluid, comprising:

a measuring tube that forms a measuring space through which the fluid can flow;

at least one baffle arranged in the measuring space; and a measured value sensor arranged downstream of the baffle in the measuring space, the measured value sensor being deflectable when flowed around by the fluid due to a vortex formation at the baffle;

wherein the measuring tube has an elliptical cross-section at least in a region of the arrangement of the baffle;

wherein the baffle has a baffle axis along which the baffle extends, with the baffle axis being aligned perpendicular to a flow axis extending through the measuring space and/or with the baffle having a round, elliptical, streamlined, trapezoidal, or triangular cross-section;

wherein the elliptical cross-section of the measuring tube is spanned by a longer main axis and a shorter secondary axis extending transversely to the main axis, with the elliptical cross-section of the measuring tube being aligned such that the secondary axis coincides with the baffle axis; and wherein a circular cross-section of a fluid inlet and/or of a fluid outlet has a diameter dimension that corresponds to a length of the main axis of the elliptical cross-section of the measuring tube and/or so that a width of the measuring space remains constant transversely from the baffle axis from the fluid inlet up to the fluid outlet.

2. The flowmeter in accordance with claim 1, wherein the measuring space of the measuring tube extends between the fluid inlet and the fluid outlet along the flow axis, with the fluid inlet having the circular cross-section that merges into the elliptical cross-section of the measuring tube along the flow axis extending up to a position of the baffle.

3. The flowmeter in accordance with claim 2, wherein the elliptical cross-section of the measuring tube merges into the circular cross-section from the position of the baffle along the flow axis up to the fluid outlet.

4. The flowmeter in accordance with claim 1, wherein a length ratio from the main axis to the secondary axis has a value from 1.1 to 2.0.

5. The flowmeter in accordance with claim 1, wherein a ratio of a length of the main axis to a length of a working surface of the baffle has a value from 0.15 to 0.6.

6. The flowmeter in accordance with claim 1, wherein the measured value sensor is arranged in a section along the flow axis in the measuring space in which the measuring space has the elliptical cross-section and merges into a circular cross-section in a direction toward the fluid outlet.

7. The flowmeter in accordance with claim 1, further comprising at least one projection projecting into the measuring space formed downstream of the baffle at an inner wall bounding the measuring space.

8. The flowmeter in accordance with claim 1, wherein the measuring tube is formed with a sheath and with an inner tube, with the inner tube being pushed into the sheath.

9. The flowmeter in accordance with claim 8, wherein the inner tube has 70% to 100% of the length of the sheath.

10. The flowmeter in accordance with claim 8, wherein the inner tube and/or the sheath has/have a fully circumferentially closed cross-section.

11. The flowmeter in accordance with claim 8, wherein the inner tube comprises a plastic; and/or the sheath comprises a metal.

12. The flowmeter in accordance with claim 8, wherein the inner tube is manufactured in an injection molding process and/or the sheath is manufactured in a cutting production process.

13. The flowmeter in accordance with claim 8, wherein the inner tube and the sheath have a same length in the flow axis.

14. The flowmeter in accordance with claim 1, wherein a length ratio from the main axis to the secondary axis has a value from 1.25 to 1.8.

15. The flowmeter in accordance with claim 1, wherein a length ratio from the main axis to the secondary axis has a value from 1.3 to 1.6.

16. The flowmeter in accordance with claim 1, wherein a ratio of a length of the main axis to a length of a working surface of the baffle has a value from 0.2 to 0.5.

17. The flowmeter in accordance with claim 1, wherein a ratio of a length of the main axis to a length of a working surface of the baffle has a value from 0.25 to 0.45.

18. A flowmeter for measuring the flow rate of a fluid, comprising:

a measuring tube that forms a measuring space through which the fluid can flow;

at least one baffle arranged in the measuring space; and a measured value sensor arranged downstream of the baffle in the measuring space, the measured value sensor being deflectable when flowed around by the fluid due to a vortex formation at the baffle;

wherein the measuring tube has an elliptical cross-section at least in a region of the arrangement of the baffle;

wherein the baffle has a baffle axis along which the baffle extends, with the baffle axis being aligned perpendicular to a flow axis extending through the measuring space and/or with the baffle having a round, elliptical, streamlined, trapezoidal, or triangular cross-section;

wherein the elliptical cross-section of the measuring tube is spanned by a longer main axis and a shorter secondary axis extending transversely to the main axis, with the elliptical cross-section of the measuring tube being aligned such that the secondary axis coincides with the baffle axis; and wherein a length ratio from the main axis to the secondary axis has a value from 1.1 to 2.0.

* * * * *